United States Patent [19]
Smith

[11] 3,795,785
[45] Mar. 5, 1974

[54] SUCCESSIVE AUTOMATIC DEPOSITION OF GENERALLY HORIZONTAL CONTIGUOUS WELD BEADS UPON NON-PLANAR SURFACES

[75] Inventor: Edward E. Smith, Upper St. Clair Township, Allegheny City, Pa.

[73] Assignee: Teledyne, Inc., Los Angeles, Calif.

[22] Filed: Nov. 17, 1972

[21] Appl. No.: 307,745

[52] U.S. Cl. .............................. 219/125 R, 219/76
[51] Int. Cl. .............................................. B23k 9/12
[58] Field of Search.. 219/76, 125 R, 125 PL, 60 A; 318/39, 578

[56] References Cited
UNITED STATES PATENTS

| | | | |
|---|---|---|---|
| 3,483,353 | 12/1969 | Braucht | 219/76 X |
| 3,568,029 | 3/1971 | Bollinger | 318/578 |
| 3,254,192 | 5/1966 | Braucht | 219/76 |
| 2,927,258 | 3/1960 | Lippel | 318/39 |
| 3,582,749 | 6/1971 | Wenzel | 318/578 X |
| 2,839,663 | 6/1958 | McCollom | 219/76 |

Primary Examiner—C. L. Albritton
Attorney, Agent, or Firm—Edward Hoopes, III

[57] ABSTRACT

Apparatus and method for automatic arc welding deposition of generally horizontal weld beads upon non-planar surfaces and more specifically upon the interior surface of the housing for a dredge pump, the apparatus including a rotatable, radially extensible horizontal boom mounted on a vertical shaft, weld metal depositing means mounted on an outboard end of the boom, means for rotating and for controlling the boom extension during rotation to automatically regulate conformance of the weld metal depositing means to the interior surface of the housing and means for controlling the rotational speed of the boom so that as the boom extends the speed of movement of the weld metal depositing means relative to the interior surface of the housing remains approximately constant during well bead deposition.

10 Claims, 12 Drawing Figures

SUCCESSIVE AUTOMATIC DEPOSITION OF GENERALLY HORIZONTAL CONTIGUOUS WELD BEADS UPON NON-PLANAR SURFACES

This invention relates to the successive automatic arc welding deposition of generally horizontal weld beads upon non-planar surfaces and more specifically upon the interior surface of a housing for a dredge pump or the like.

Dredge pumps are used in rivers and other waterways to pump sand and gravel-laden water. The pump housings are of great size and mass and are subject to rapid wear due to abrasion or cavitation or a combination of the two. As the interior surface of the pump housing wears a continuously increasing clearance develops between the rotating pump element and the housing resulting in great loss of efficiency. Such loss of efficiency can be tolerated only to a certain extent after which the housing must be either replaced or restored to its original interior dimensions by application of metal to the interior work surface. Since the housings are costly structures the customary procedure is to build up the inner surface by weld deposition. With care such an operation can be repeated as many as thirty or forty times on a single housing.

In order to apply weld metal to the inner surface of the dredge pump housing the pump is disassembled and the hollow housing or shell which has a shape similar to a volute or a snail shell is positioned on its side so that the circular side openings are disposed at the top and bottom. In some cases such housings have only one large circular side opening, the other side having only a small opening for access; in such cases the large side opening when the housing is in position for welding would of course be either at the top or at the bottom. Ordinarily the weld metal is applied to the relatively flat portions of the inner surface of the housing first and then subsequent beads are continued to the center line or portion of greatest diameter. In this manner one half of the shell is rebuilt. To rebuild the other half the shell is turned over and the sequence of welding is repeated on the other half.

Since rebuilding of dredge pump housings was first begun those skilled in the art have constantly sought ways to speed up the rebuilding operation while reducing the amount of set-up time and/or welder attention. Originally one or more welders standing in the opening of the housing or even crawling into the cavity of the larger housings would apply the weld metal, at first using stick welding electrodes and later using semi-automatic welding guns which provided important savings in application costs.

After it had been known for some time to build up the interior of pump shells and the like by depositing weld metal either manually or by rotating weld metal depositing means within the object to be clad, U.S. Pat. No. 3,254,192 disclosed a particular form of rotating weld metal depositing means which was employed under certain specified welding conditions. For brevity I shall employ the term "welding head" to refer to weld metal depositing means which may take a wide variety of forms as well known to those skilled in the art. The welding conditions selected were considered to be suitable operating conditions for certain automatic welding electrodes then commercially available which in depositing check-crack type beads promoted self stress-relief and low bead warpage. Rotation of the boom or arm bearing the welding head about a central point was accomplished by engagement of a driving wheel with the rim of the circular side opening of the housing. A major difficulty with this method was that the operator had to constantly adjust the location of the welding head on the rotating arm because of the peculiar non-circular shape of the housing. As the welding head moved around the inner surface of the housing the distance between the pivot about which the welding head turned and the surface to which the weld metal was being applied was constantly changing so that the operator had to be virtually continuously engaged in adjusting the welding head at a uniform distance from the work. In the course of applying one complete horizontal bead on a large dredge pump housing it was sometimes necessary to hand rack the welding head outwardly as much as 16 inches and then hand rack the welding head back an equal amount in returning to the starting point. In addition to this horizontal distance control, which occupied the major portion of the welder's time in resurfacing a dredge pump housing, the welder had to reposition the welding head after completion of each weld bead in order that the succeeding bead would be deposited in proper relationship to the prior bead.

The apparatus described in the above mentioned United States patent, because it had a boom-supporting frame mounted over the dredge door opening, acted somewhat as a cage confining the welder and impeding his egress in the event of an emergency. Another disadvantage of this early rotating arm or boom apparatus was that with such apparatus it was very difficult, if not impossible, to apply weld metal to the interior surface of the discharge portion of the housing, a cylindrical section extending tangentially from the point of greatest radial distance from the side opening. As a result, in most cases that part of the housing was completed using stick or semi-automatic welding after the main portion had been resurfaced, which added to the time required to complete the total resurfacing job.

Some of the problems existing with the above described apparatus were solved by the apparatus described in U.S. Pat. No. 3,569,658. According to that patent the boom and supporting frame were eliminated and replaced by a guideway extending parallel to the interior surface of the housing and supported by adjustable brackets fastened to the exterior rim of the side opening of the housing. Weld metal was deposited using a welding head which was movable along the guideway and adapted during such movement to apply weld metal to the surface. The welding head had a supporting portion exterior of the housing and horizontally propellable around the guideway and another portion extending through the upwardly facing side opening of the housing to the interior thereof and adapted during movement of the welding head along the guideway to closely traverse the interior surface of the housing for applying weld metal thereto. Since the guideway provided for maintaining the path of the welding head substantially parallel to the surface upon which weld beads were being deposited, the necessity for the welder to constantly rack the welding head in and out to maintain a proper distance of the welding head from the surface was eliminated. Also, since the guideway was mounted on the rim of the side opening of the housing the space above the welder was open, thus affording him rapid and unobstructed egress from his welding station in the event of an emergency. A third advantage was that use of the guideway enabled the path of the welding head to be extended farther into the cylindrical discharge portion of the housing, so that a greater portion of the total interior surface could be rebuilt using that apparatus than was possible using the earlier boom apparatus.

Even though the guideway apparatus greatly reduced operator fatigue and increased efficiency by virtue of the fact that continuous concentration of the operator in adjusting the welding head was not necessary, the operator's presence was still required within the housing during the welding operation to reposition the welding head at the completion of each weld bead so that the subsequent weld bead would be applied in proper relationship, generally contiguous, to the previous one.

Further advance in the art is disclosed in my U.S. Pat. No. 3,627,973, which describes a method and apparatus for automatic control of the welding head throughout the continuous application of a plurality of generally horizontal contiguous weld beads to the interior surface of the housing for a dredge pump or the like. In my patent provision is made for automatic reversal of the direction of weld deposition when the welding head completes a weld pass at either of the predetermined points between which weld metal is to be deposited, and at each weld direction reversal point the welding head is automatically repositioned with respect to the surface to a new effective weld depositing position by motorized shifting of the welding head in predetermined direction and extent at least one of horizontally, vertically and angularly. This motorized shifting is programmed to produce conformance of the welding head to the surface during the deposition of a plurality of generally horizontal weld beads without welding operator attention. In a preferred embodiment of the apparatus disclosed in my patent the welding head is supported and moved parallel to the surface being weld coated in the manner described in U.S. Pat. No. 3,569,658. The motorized repositioning of the welding head at the end of each weld pass eliminates yet another of the shortcomings of prior apparatus in that under some conditions the welder does not need to be in attendance at the welding station for as much as 4 hours at a time and thus can do other jobs in the vicinity of the housing as well as reduce his exposure to the heat and smoke from the welding operation.

With each of the above described machines it was and is necessary to mount equipment fixedly on the dredge pump housing in order to support and move the welding head. Such necessity involves set-up time which, although small in comparison to the overall welding time, is nonetheless undesirable from the user's standpoint.

In partial answer to the need for improved apparatus for dredge pump resurfacing, a post and boom machine has recently been introduced having a radially extensible horizontal boom able to maintain a relatively uniform distance between the welding head and the surface being rebuilt. To secure this conformity a roller chain is mounted on the rotating boom which "walks" around a stationary sprocket concentric with the vertical shaft supporting the boom; such arrangement permits the spring-urged boom to extend radially as it rotates so that the welding head traverses a spiral path which approximates the shape of the particular pump housing being rebuilt. For a different size housing a change in the size of the sprocket governs the depth of the spiral path followed by the welding head. For ease of installation this post and boom type apparatus stands free upon its own supporting legs; in use it is positioned at the pump center with the boom projecting into the pump cavity. The usual means for reversing the direction of the welding head after a weld pass has been completed at predetermined reversal points is included in this apparatus, and the apparatus can become still more effective if equipped to incorporate the invention disclosed in my above mentioned patent which provides for automatic programmed repositioning of the welding head at each weld direction reversal point so that successive beads are deposited in proper relationship to one another.

Several disadvantages exist, however, even with the above described post-and-boom apparatus. The first is that because of the limitations inherent in the roller chain and sprocket arrangement for boom extension it is impossible for the welding head to extend into the cylindrical discharge portion of the housing to any appreciable extent and thus that portion of the housing still has to be completed by stick or semiautomatic welding. A second disadvantage is that because the boom rotates at a constant angular velocity, extension thereof to conform to the surface being rebuilt results in increasing velocity of the welding head with respect to the surface of the housing according to well known laws of mechanics. The point of maximum relative velocity of the welding head occurs at the portion of the housing nearest the discharge cylinder. With the normal wear pattern experienced in dredge pump housings this portion immediately adjacent to the discharge cylinder is subject to the severest wear and thus requires more weld metal to rebuild to a given contour than does the rest of the housing. Thus with this apparatus the welding head is travelling fastest and depositing the least weld metal at the point where the most buildup is required.

Another problem common to all prior dredge pump rebuilding machines in which the direction of welding is automatically reversed at the end of each pass is that, as far as I am aware, each of them continues deposition weld metal throughout all the automatic steps; i.e., when a bead is completed weld deposition continues while the welding head reverses direction and/or is repositioned for the subsequent bead. Because of this characteristic the hot weld puddle at the end of one bead does not have sufficient time to cool before the beginning of the next bead is deposited adjacent to the puddle, with the result that when welding on the curved portion of the housing, i.e., out of the horizontal position, weld puddle runout is often experienced wherein molten metal runs out of the deposit and is thus wasted.

I provide dredge pump housing rebuilding apparatus of the vertical post-horizontal boom type which eliminates the above mentioned disadvantages of prior equipment and has further advantages thereover.

The word "horizontal", as used herein with respect to the boom of my apparatus, is intended to encompass both the absolute horizontal position and positions slightly out of the horizontal, i.e., slightly tilted; the boom in my apparatus is generally horizontal but not necessarily absolutely horizontal.

I provide, in apparatus for the successive automatic arc welding deposition of generally horizontal weld beads upon the interior surface of a housing for a dredge pump or the like while the housing is lying on its side, the apparatus being of the type which includes a rotatable, radially extensible horizontal boom mounted on a vertical shaft, the boom extending substantially perpendicular to the shaft, weld metal depositing means mounted on an outboard end of the boom, means for rotating the boom about the shaft axis whereby to move the weld metal depositing means in a horizontal path over the interior surface of the housing, and means for programming the boom extension during rotation to automatically regulate conformance of the weld metal depositing means to the interior surface of the housing, the improvement which comprises means for automatically controlling the rotational speed of the boom so that as the boom extends the speed of movement of the weld metal depositing means relative to the interior surface of the housing remains approximately constant during weld bead deposition. The programming means may comprise cam and follower means. Means may be provided for automatically reversing the direction of welding after the weld metal depositing means have completed a weld pass at either of certain predetermined points, together with means for automatically repositioning the weld metal depositing means at each weld direction reversal point. Timing means may be provided for automatically discontinuing weld deposition and delaying movement of the boom, both for a predetermined period of time, at either of the predetermined points whereby weld puddle runout is decreased. Weld deposition may be automatically discontinued at either of the predetermined points while continuing movement of the weld metal depositing means in a first horizontal direction and timing means may be provided for delaying reversal of the weld metal depositing means for a predetermined time after the weld metal depositing means have travelled past the point of discontinuance of weld deposition together with means for automatically resuming weld deposition when the weld metal depositing means pass the point of discontinuance of weld deposition moving in the opposite direction from the first horizontal direction, whereby to reduce weld puddle runout at either of the predetermined points. A reversible variable speed electric motor may be provided together with means connected to the speed control of the motor and responsive to the boom position for automatically causing the motor speed to decrease with boom extension and to increase with boom retraction.

I further provide a method of applying generally horizontal weld beads upon the interior surface of a housing for a dredge pump or the like, which housing has a circular side opening, comprising positioning the housing on its side so that the side opening is at the top or bottom thereof, positioning a rotatable radially extensible horizontal boom within the housing with its center of rotation approximately at the center of the circular side opening of the housing, mounting weld metal depositing means on an outboard end of the boom, rotating the boom to move the weld metal depositing means in a horizontal path over the interior surface of the housing, programming the relationship between boom rotational position and boom extension so that during rotation the end of the boom carrying the weld metal depositing means is maintained approximately a constant distance from the interior surface of the housing, feeding consumable welding wire through the weld metal depositing means, establishing an arc between the end of the welding wire and the interior surface of the housing to deposit weld metal in a horizontal path and programming rotational speed of the boom so that as the boom extends its rotational speed automatically decreases at a rate sufficient to maintain approximately constant the speed of movement of the weld metal depositing means relative to the interior surface of the housing. A cam plate may be formed whose changes in distance between cam face and boom rotation point closely approximate the corresponding changes in distance between the dredge housing interior and the boom rotation point, and a cam follower may be attached to the horizontal boom and the cam may be positioned so that the cam follower conforms to the cam face and causes radial extension or retraction of the boom during boom rotation, such radial extension or retraction serving to maintain approximately constant the distance between the weld metal depositing means and the interior surface of the housing.

Other details, objects and advantages of my invention will become apparent as the following description of a present preferred embodiment thereof and a present preferred method of practicing the same proceeds.

In the accompanying drawings I have shown a present preferred embodiment of the invention and have illustrated a present preferred method of practicing the same in which FIG. 1 is a plan view of a typical dredge pump housing illustrating the non-circular generally volute shape thereof;

Figure 1:
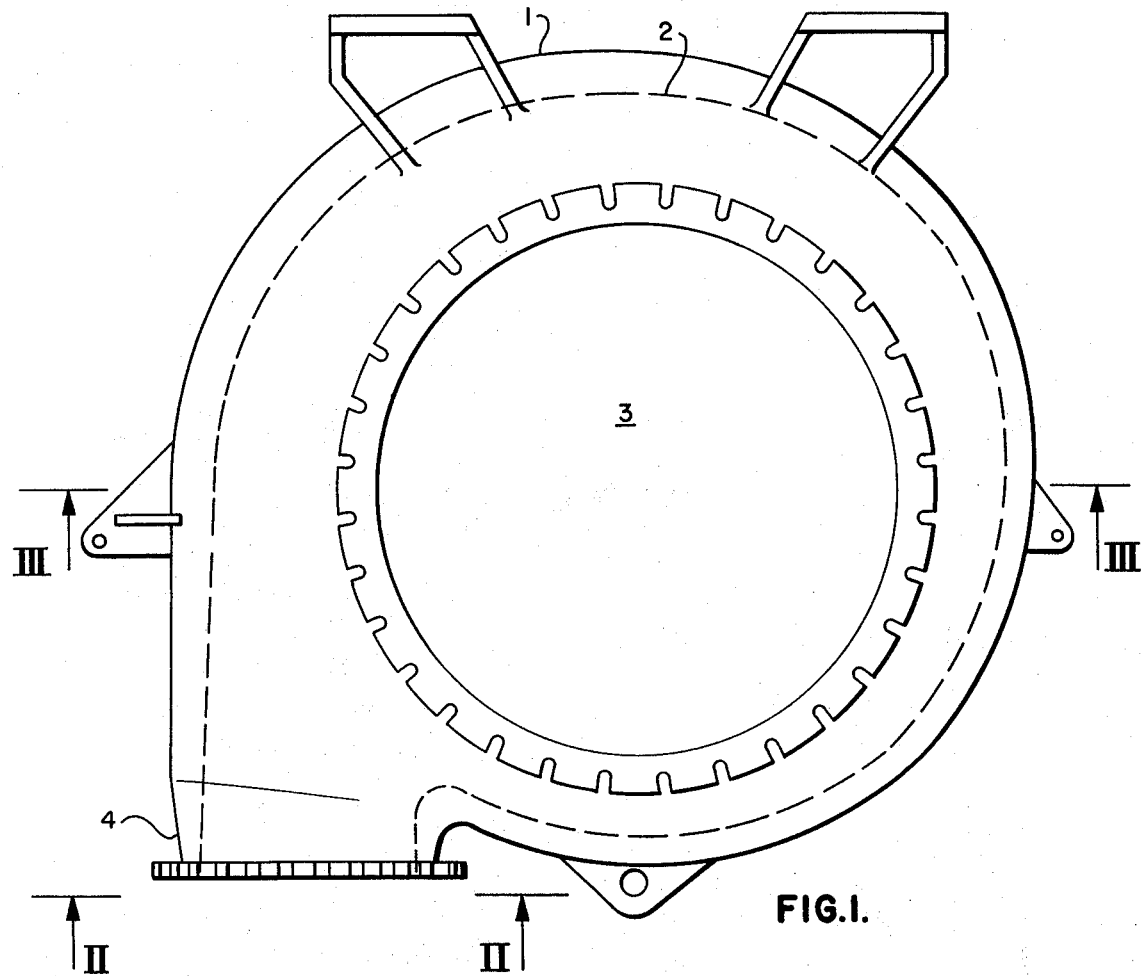
Figure 2:
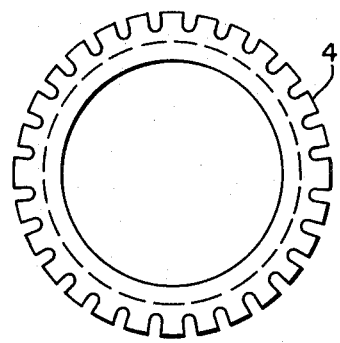
FIG. 2 is a face view of the discharge portion of the dredge pump housing taken on the line II—II of FIG. 1.

Referring now more particularly to the drawings, FIG. 1 shows in plan view a typical dredge pump housing, designated generally by reference numeral 1, having a circular side opening 3. The non-circular shape of the housing is evident both from the outer contour and from the contour of the interior surface shown by the broken line 2. The outer terminus of the discharge portion 4 of the housing is shown in FIG. 2.

Figure 3:
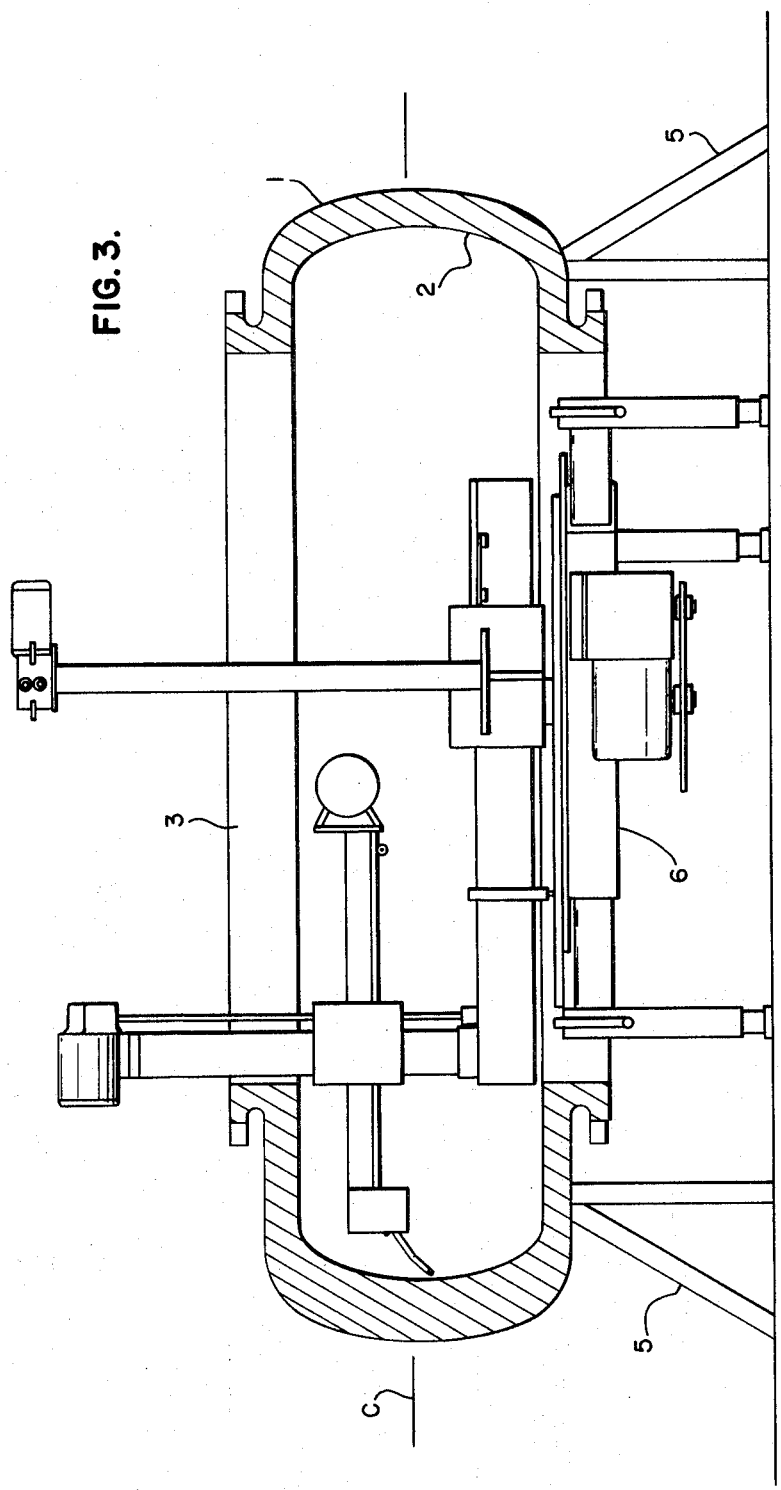
FIG. 3 is a vertical cross-section of the dredge pump housing taken on the line III—III of FIG. 1 and showing typical mounting supports for the housing and a preferred form of my apparatus set up for application of weld metal to the interior surface thereof, with parts, including wiring, omitted for clarity of illustration.

FIG. 3 shows the housing 1 disposed on its side ready for application of weld metal to its interior surface 2. The housing, which in the form shown has two circular side openings, is supported above the ground as by struts 5 and the means for applying metal to the surface 2 by deposit welding, designated generally by reference numeral 6, is set up within the housing. As above mentioned, application of weld metal generally begins at the relatively flat portion of the interior surface adjacent the lower of the circular side openings and then subsequent beads are continued to the center line or portion of greatest diameter, which is indicated by the reference character C in FIG. 3.

Figure 4:
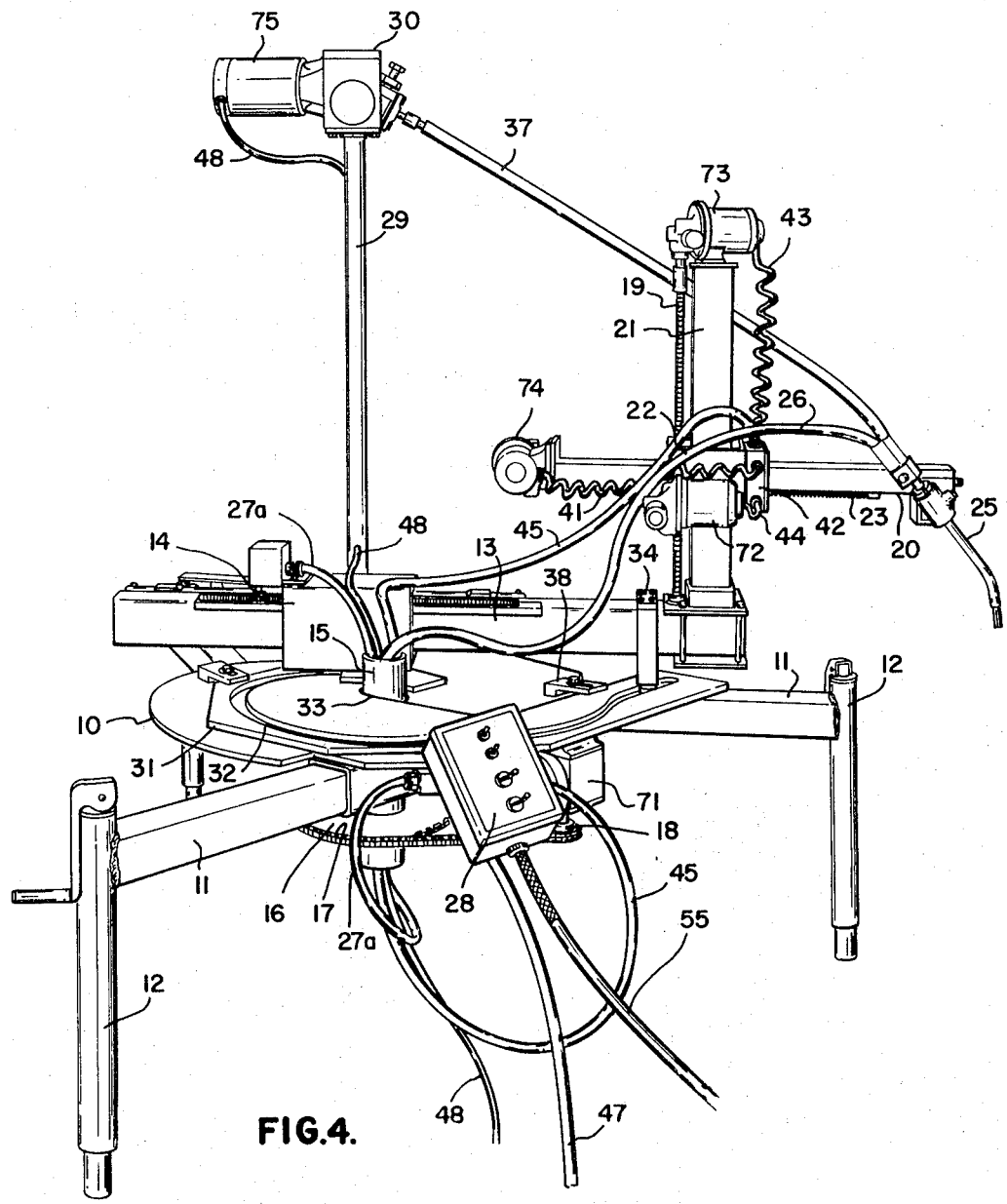
FIG. 4 is a general view showing one form which my apparatus may take.
Figure 5:
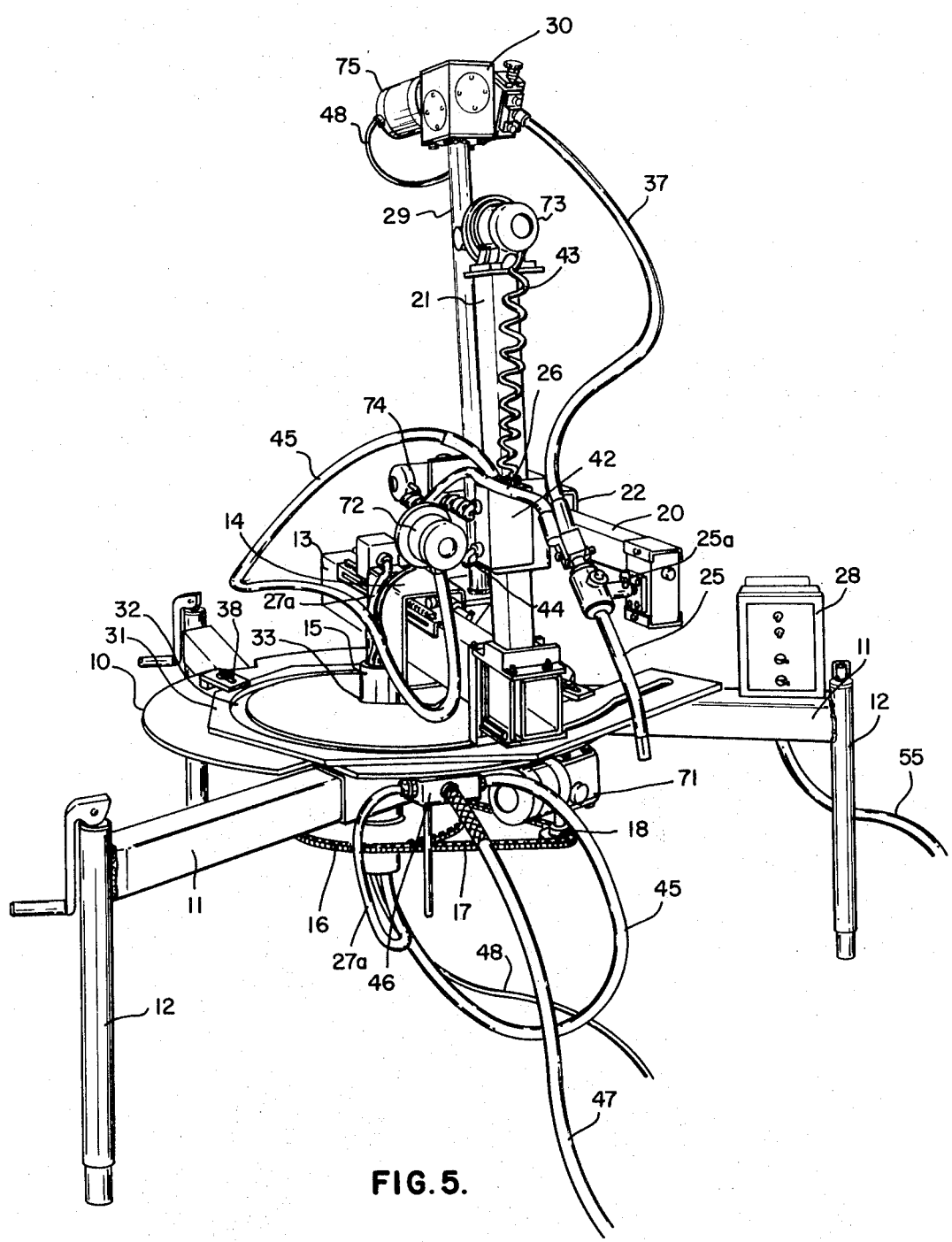
FIG. 5 is another general view of the apparatus shown in FIG. 4 but with the boom in a different rotational position and showing more clearly the drive arrangement for rotating the boom.

Referring to FIGS. 4 and 5, the apparatus includes a circular base plate 10 supported on extensible arms 11, typically three in number. At the end of each arm is a support post 12, the height of which is controlled by a screw-type jack. A radially extensible horizontal boom 13 is supported for horizontal movement by a housing 14 mounted for rotation on a vertical shaft 15 which is journalled in the support plate 10. In the embodiment shown the shaft comprises a hollow cylindrical bearing which both supports the boom and associated fixtures and provides unobstructed passage for electrical cables from beneath the base plate to their connection points. Attached to the bottom of the shaft 15 is a sprocket 16 which is connected through a chain 17 to a smaller sprocket 18 which in turn is driven by a reversible variable speed motor 71. The motor 71 causes rotation of the boom 13 about the axis of the vertical shaft 15; such rotation may be in either direction depending on the direction in which the motor is driven. An electrical cable, not shown, leads from the motor to the main control panel 27 (FIG. 10), not shown in FIGS. 4 and 5.

The radially extensible horizontal boom 13 supports a vertical member or post 21 on which is mounted a bracket 22 supporting a horizontal member or slide 20. The slide 20 carries at its outer end the welding head which includes a welding nozzle 25 journalled for angular rotation about the axis of the stub shaft 25a. The stub shaft 25a is connected through worm gearing to a shaft extending through the length of the slide 20 and driven through suitable gearing by a reversible electric motor 74 to effect adjustment of the angular position of the nozzle 25. Angular adjustment of the nozzle causes the end of the nozzle to move either up or down, depending on the direction in which the motor 74 is driven. An electrical cable 41 connects the motor 74 with a junction box 42 mounted on the bracket 22. Also connected to the nozzle 25 is a welding cable 26 which leads down through the hollow vertical shaft 15 and thence to a welding power source, not shown, which may be of a conventional type and is preferably a constant potential power source. Vertical adjustment of the nozzle is provided by reversible electric motor 73 mounted atop the post 21 which drives a screw shaft 19 threaded through a nut carrier by bracket 22, and horizontal adjustment of the nozzle is provided by reversible electric motor 72 carried by the bracket 22 driving a pinion, not shown, in mesh with a rack 23 carried by the slide 20, whereby the slide 20 is moved horizontally. The bracket 22 may be moved either up or down depending on the direction in which motor 73 is driven, and the slide 20 may be moved either to the right or to the left viewing FIG. 4 depending on the direction in which motor 72 is driven. Electrical cables 43 and 44 connect the motors 73 and 72 respectively with the junction box 42.

The junction box 42 serves to connect electrical cables 41, 43 and 44 with a main cable 45 which leads down through the bore in the vertical shaft 15 and to a second junction box 46, hidden in FIG. 4 but visible in FIG. 5, mounted at the side of the base plate 10. From the second junction box 46 a master electric cable 47 leads to the main control panel 27.

A vertical post 29 attached to the housing 14 which supports the horizontal boom 13 carries at its upper end a wire driving unit 30 comprising welding wire feeding rolls powered by a motor 75 for supplying welding wire through a guide hose or conduit 37 to the nozzle 25 during weld deposition. An electrical cable 48 leads from the wire feed motor 75 down through the vertical post and thence through the bore in the vertical shaft 15 to the main control panel 27.

Conformance of the welding nozzle 25 to the interior surface of the housing is accomplished by means of a cam and follower arrangement. A cam plate 31, shown separately in FIG. 6, has a locating slot 33 which fits around the vertical shaft 15 and thereby locates the cam plate with respect to the boom rotation point which is the axis of the shaft 15. Cut into the cam plate is a slot 32 defining a path or cam face for a roller follower. The shape of the cam face 32 is such that the changes in distance between the cam face the the boom rotation point located at the slot 33 closely approximate the corresponding changes in distance between the interior surface of the housing and the boom rotation point when the apparatus is in place within the housing.

Figure 6:
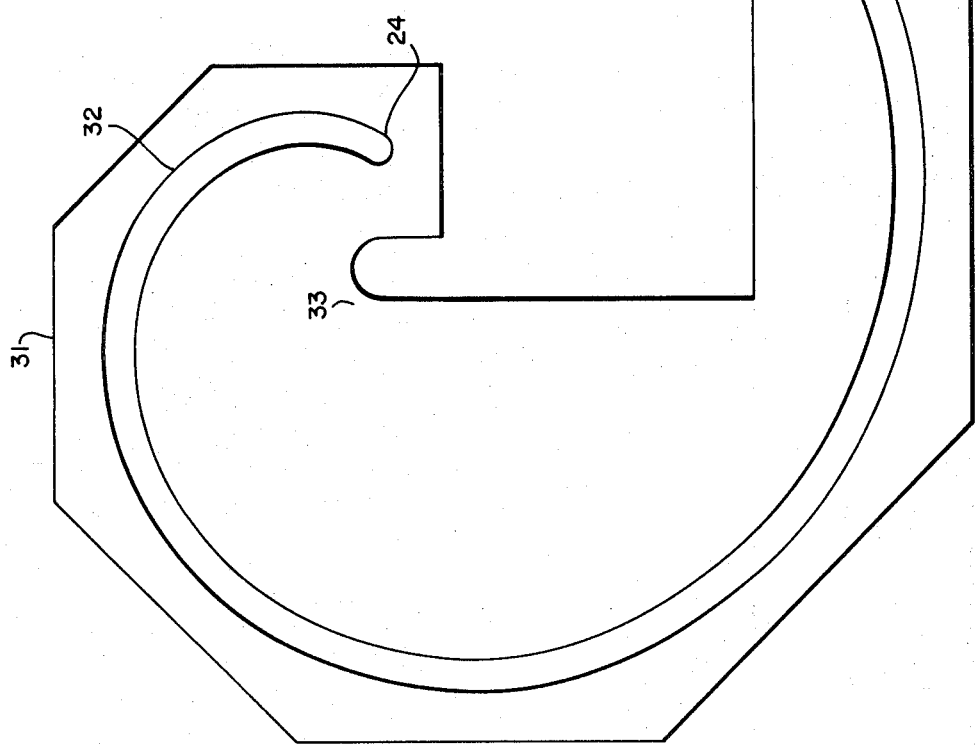
FIG. 6 is a plan view of a cam plate used with my apparatus.

As an example of how a typical cam slot can be formed, construction of the slot 32 of the cam plate 31 in FIG. 6 involves first locating the center of the semicircle formed by the slot 33, then defining a 0° base line, drilling a hole on the base line at 24, a short distance from the center point, drilling successive holes on 10° radial lines at constantly increasing distances from the center point for each radial line up to 300°, and cutting a smooth curve slot connecting the holes. After the 300° radial line additional holes are drilled at 10° radial lines in order to form the portion corresponding to the discharge cylinder of the housing and the slot is continued in a straight line through the additional holes. The resulting slot approximates the profile of a typical dredge pump housing. The shape of the cam face for a different size or shape housing is readily determinable by reference to the mechanical drawings used in fabricating the housing itself, which show the curvature of the interior surface of the housing as in FIG. 1. The cam plate 31 is mounted on the base plate 10 of the apparatus with slot 33 fitted around the vertical shaft 15 and is held in position by brackets 38.

Figure 7:
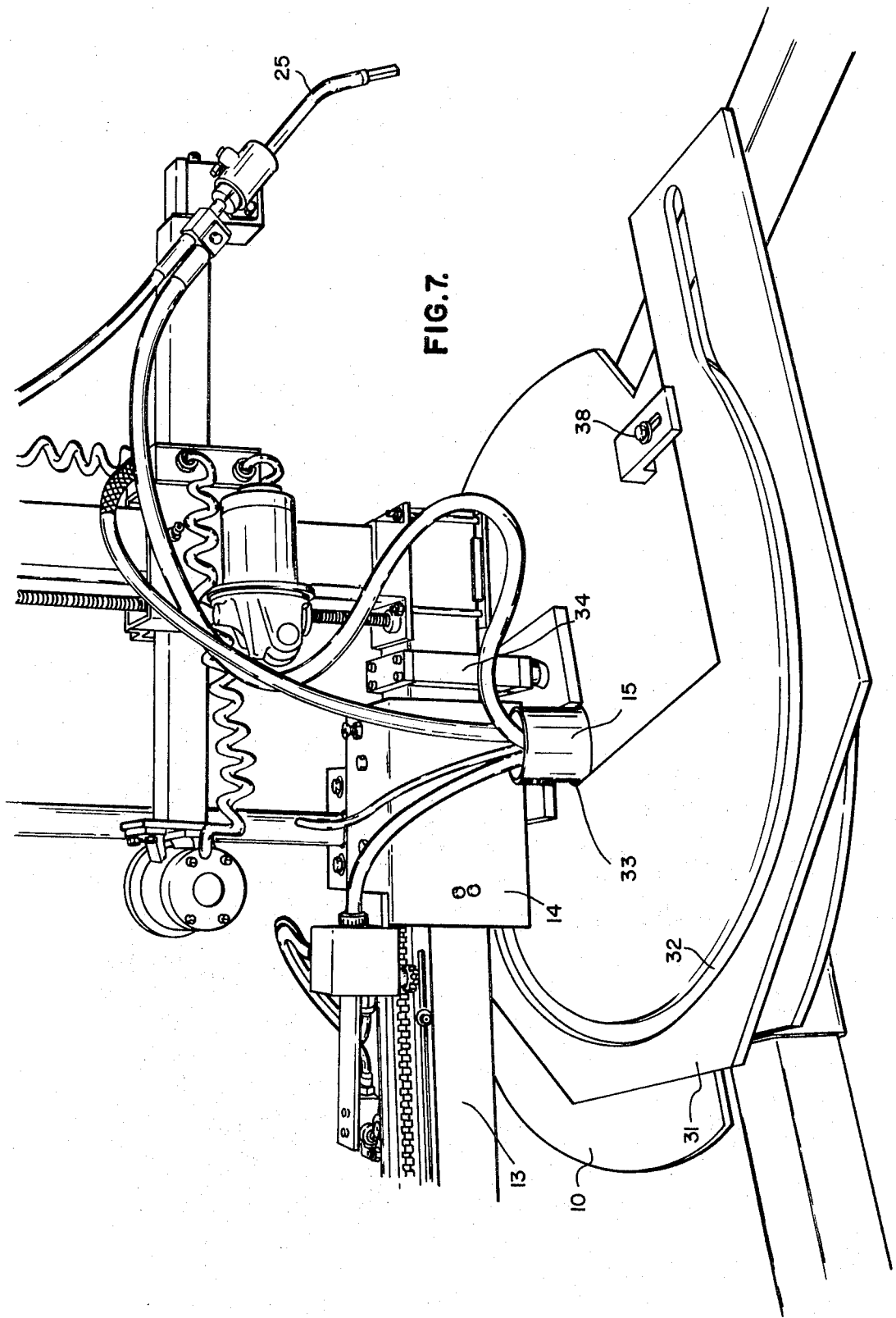
FIG. 7 is a close-up view of the apparatus with the boom fully retracted as at the beginning of a weld pass.
Figure 8:
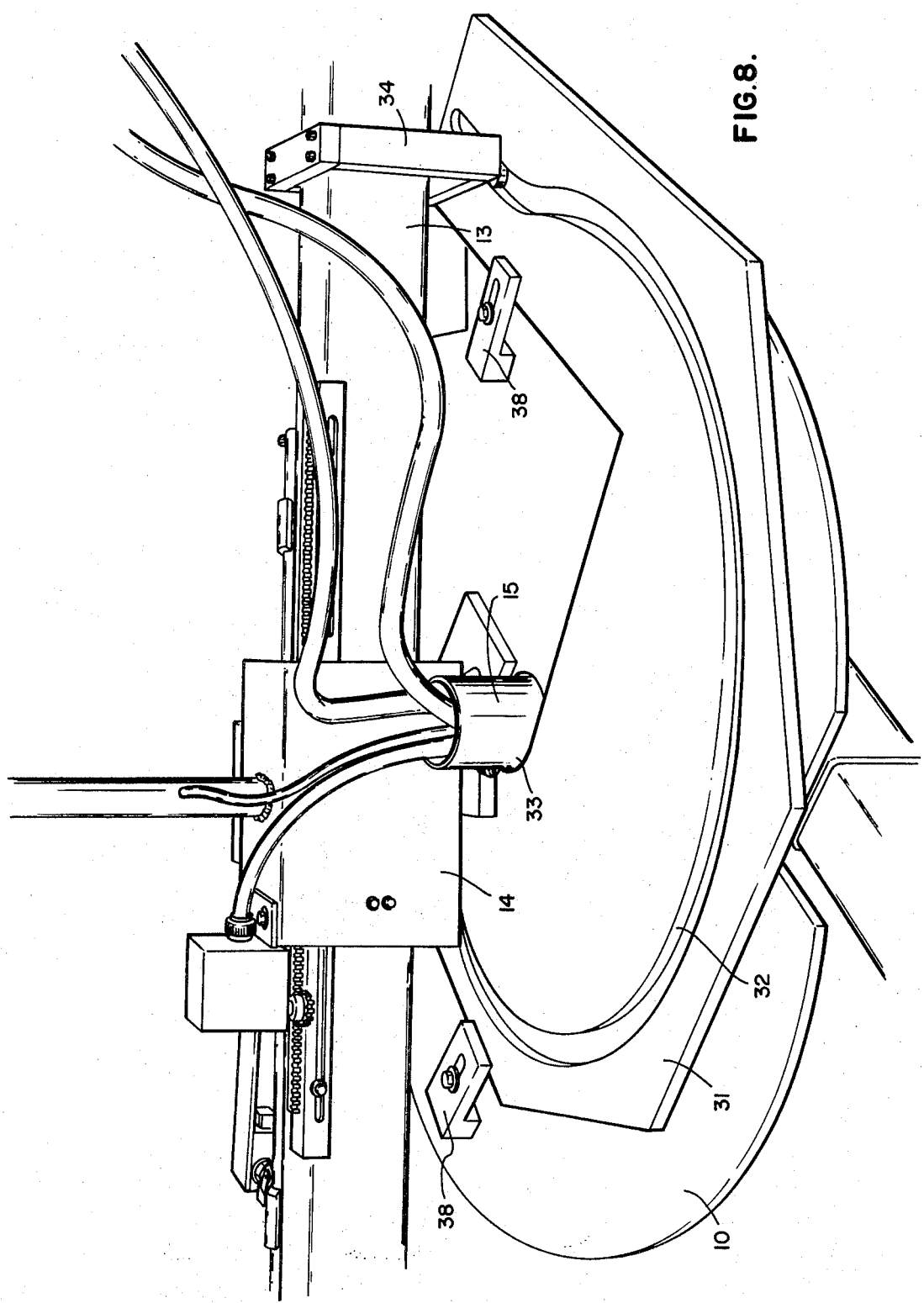
FIG. 8 is a view similar to FIG. 7 but with the boom approaching its fully extended position as it would be at the end of the weld pass.

A roller follower 34 attached to the radially extensible horizontal boom 13 has its roller extending into slot 32 in cam plate 31, whereby as the horizontal boom rotates the cam follower causes radial extension or retraction of the boom as determined by the cam face. FIG. 7 shows the boom in its most retracted position with the follower at the innermost portion of the cam face, and FIG. 8 shows the boom in its almost fully extended position for the particular cam shape and follower location illustrated; note that in FIG. 8 the follower 34 is in the straight line portion of the cam, in which portion the welding nozzle extends into the discharge portion of the dredge housing.

Figure 9:
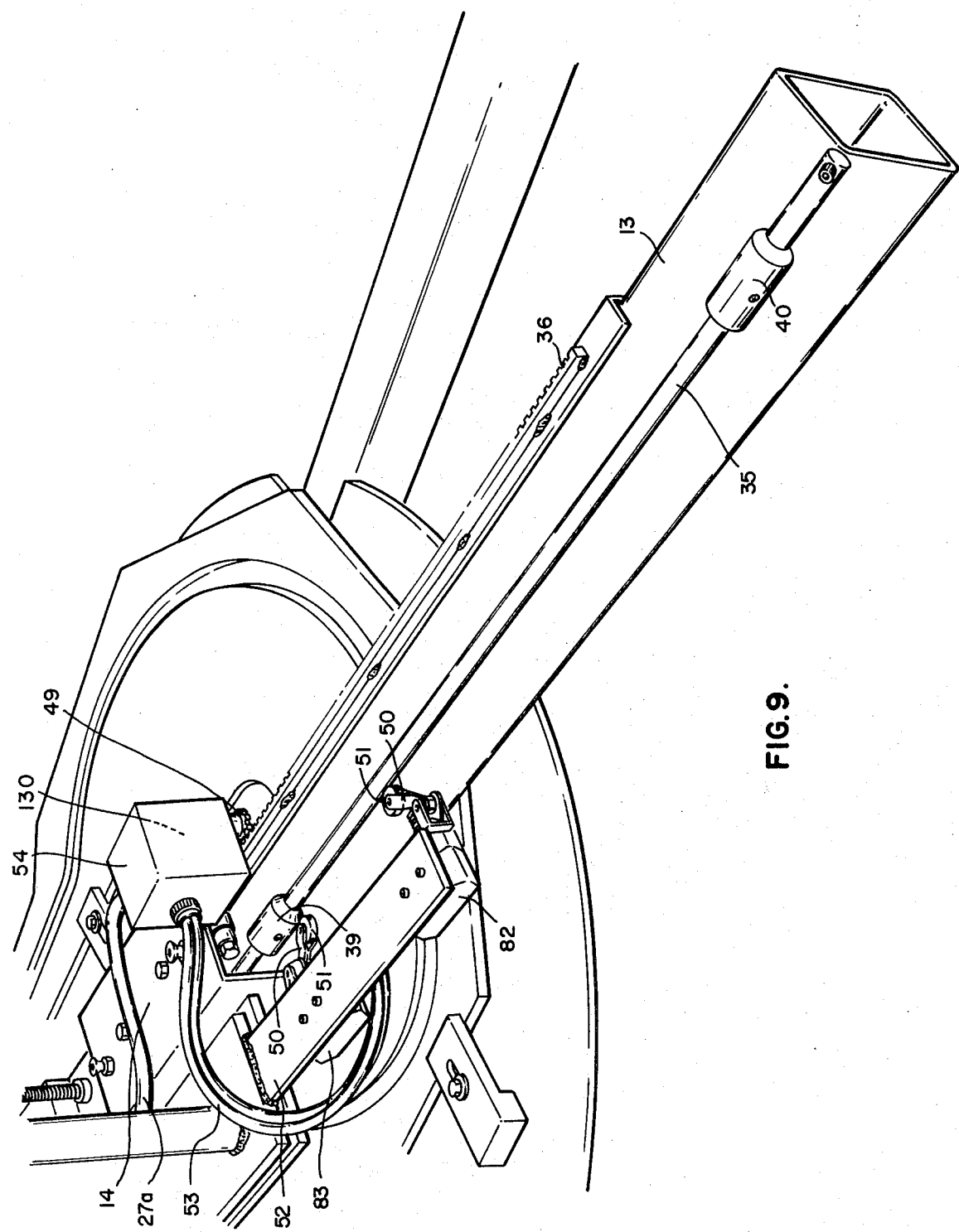
FIG. 9 is a close-up view of the end of the boom opposite the end carrying the welding head, showing an arrangement for automatically varying the boom rotational speed inversely with boom extension.

Referring now to FIG. 9, a horizontal plate 52 is attached to the housing 14 on the side opposite the end of the boom carrying the welding head. Mounted on the plate are two limit switches 82 and 83, each operated through a lever 50 by a roller 51. Electrical cables 53 lead from the limit switches to a junction point within a case designated 54 which is attached to the housing 14. The limit switches are axially aligned with the horizontal boom 13. Mounted on the horizontal boom 13 is a bar 35 carrying two positionally adjustable stop members 39 and 40, the purpose of which is to coact with the limit switches 83 and 82 respectively, when the welding means reaches the respective ends of the path over which weld metal is to be deposited, as will be explained more fully below.

The above mentioned case 54 attached to the housing 14 contains a multi-turn potentiometer which is not visible but which is designated 130. Connected to the rotor of the potentiometer is a pinion 49 whose axis of rotation is perpendicular to the horizontal boom 13. A rack 36 is attached to the horizontal boom 13 so as to be in mesh with the pinion 49, whereby as the horizontal boom extends or retracts the rack turns the pinion clockwise or counterclockwise as the case may be for the purpose of varying the speed of the drive motor 71, as will be more fully explained below. The wires 53 from the limit switches 82 and 83 and the leads from the potentiometer 130 are carried by an electrical cable 27a from the case 54 down through the bore in the vertical shaft 15 and thence to the junction box 46, where the cable 27a enters the master cable 47 leading to the main control panel 27.

FIGS. 4 and 5 also show the remote control panel 28 (FIG. 11), which is connected by electrical cable 55 to the main control panel 27, not shown in these two figures. The main control panel 27 may be mounted on a supporting pedestal and is connected with the power source, not shown, through a second cable and to the junction box 46 on the base plate 10 through a third cable 47 mentioned above. The remote control panel 28 is shown in FIG. 4 as lying atop the junction box 46 and in FIG. 5 as resting on one of the extensible arms 11; it may, of course, be disposed wherever desired within the limits of the length of the electrical cable 55.

As above mentioned, electrical cable 26 from the welding head passes through the bore in the vertical shaft 15 and thence to the welding power source. To complete the welding circuit a ground cable, not shown, from the power source is connected to the dredge pump housing at a convenient location thereon by conventional means.

Figure 10:
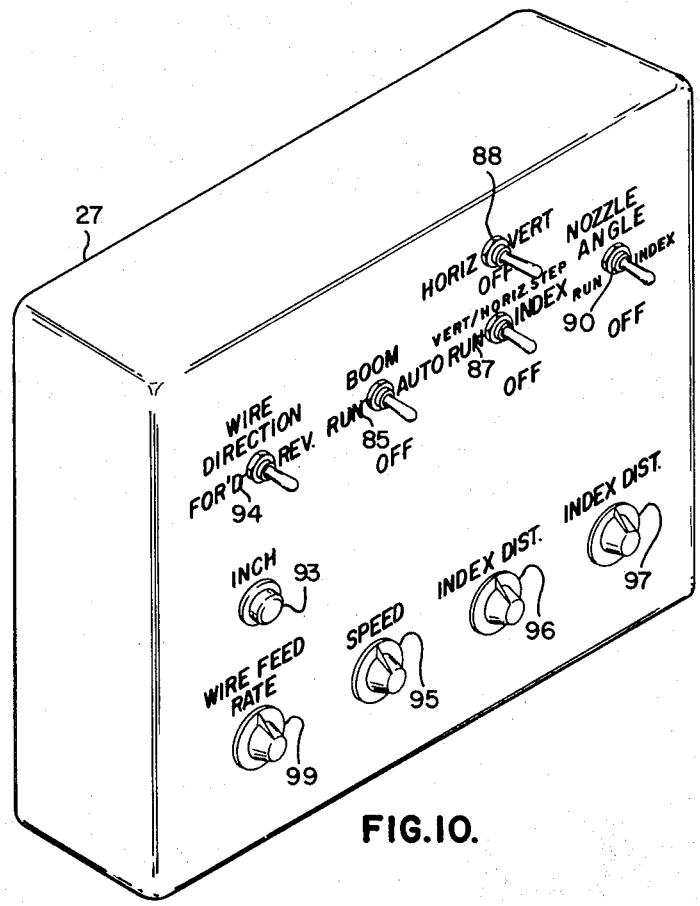
FIG. 10 is an isometric view of the main control panel for the apparatus.
Figure 11:
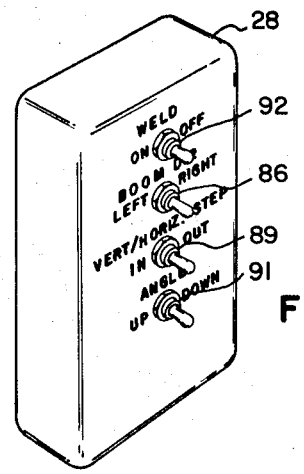
FIG. 11 is an isometric view of the remote control panel for the apparatus.

Referring now to FIGS. 10 and 11, it will be seen that the main control panel 27 shown in FIG. 10 includes four groups of controls. Each of the four groups of controls includes a toggle switch at the upper portion and a variable autotransformer (VAT) control at the lower portion. The group of controls third from the left includes a second toggle switch. Each of the toggle switches has left, center and right positions, the center position being the off position. As the toggle switches are shown in FIG. 10 they are all in the off position. At the left in FIG. 10 are controls for the direction and speed of the welding electrode or wire which are connected to the wire driving motor 75. The toggle switch 94 controls the direction of the wire, i.e., forward and reverse, and the VAT 99 controls the rate of wire feed. In between the toggle switch 94 and VAT 99 is a push button switch 93 for inching the wire. Next to the right are controls for the boom 13 which are connected with the motor 71. The toggle switch 85 provides for either continuous operation of the boom motor in the absence of any welding (RUN) or automatic operation thereof when welding so that the boom moves when the arc is first struck (AUTO). VAT 95 controls the speed of rotation of the boom at the beginning of welding; as more fully explained below, this speed is automatically varied inversely with boom extension so as to maintain the velocity of the welding head relative to the interior surface of the housing approximately constant during weld deposition.

Adjacent the boom controls on the right are a set of controls for either horizontal or vertical movement of the welding head. The position of toggle switch 88, either HORIZ, OFF or VERT, determines respectively whether horizontal motion, no linear motion or vertical motion of the welding head will occur. The HORIZ. STEP VERTICAL toggle switch 87 has RUN and INDEX positions and is connected with the motors 72 and 73 for controlling horizontal or vertical movement respectively of the welding head. Similarly the NOZZLE ANGLE toggle switch 90 is connected with the motor 74 and controls the angular movement of the welding nozzle.

The two INDEX DIST. VATs 96 and 97 control the speeds of the respective motors. When each toggle switch is set at INDEX the index distance is increased by increasing the motor speed for a predetermined constant running time of the corresponding motor and decreased by decreasing the motor speed for the predetermined constant running time of the corresponding motor.

The remote control panel 28 (FIG. 11) carries four toggle switches. The top one 92 is a master toggle switch which initiates or stops the entire welding operation and the second 86 determines boom rotation direction. The third toggle switch 89 controls either in and out horizontal movement of the welding head or up and down vertical movement of the welding head, as determined by the setting of toggle switch 88 on the main control panel, and the bottom switch 91 controls angular movement of the welding nozzle.

In use of the above described apparatus for rebuilding the interior surface of a dredge pump housing the operator performs the following listed steps:

1. Position the dredge pump housing on its side. It is preferable but not always necessary to support the housing some distance from the floor or ground level as illustrated in FIG. 3.
2. Position the apparatus so that the center of rotation of the boom 13 is as near the center of the side opening as possible. To facilitate placement of the apparatus the boom should usually be in its midway position — i.e., extending equal distances on both sides of the housing 14 — and the slide 20 should be in its fully retracted position — i.e., so that the welding head is as close as possible to the vertical member 21. The extensible arms 11 should be positioned so that the circle formed by the posts 12 at the ends of the arms is smaller than the circular side opening of the housing.

3. Using the screw jacks in the posts 12, level the apparatus and adjust its height so that there is enough room for vertical movement of the welding head to allow weld deposition up to the height of the housing's center line or portion of greatest diameter. When resurfacing the interior of a housing having only one large side opening and the side opening is at the top, my apparatus is placed within the housing with its support legs resting on the closed portion of the lower side and its height is adjusted so that it "squats" down within the housing during application of weld metal. When the side opening is at the bottom, the housing is supported above the ground and the apparatus is positioned on the ground with its height adjusted so that the boom and welding means extend up into the housing.
4. Attach the cam plate 31 to the base plate 10. (It is assumed that a cam plate has been made for the housing being surfaced). Position the cam plate so that the orientation of the cam path matches the orientation of the housing periphery.
5. Position the main control panel 27 and welding power source at convenient locations outside the housing and complete all electrical connections.
6. Turn on main power.
7. Determine the limits of the path over which welding metal is to be deposited and rotate the boom 13 by turning switch 85 on the main panel to RUN and switch 86 on the remote panel to LEFT or RIGHT, as necessary, so that the welding means is at the end of the path where the boom is most retracted; this is the starting position.
8. Position stop member 39 on the boom 35 so that it closes limit switch 83 when the boom is at the starting position. Rotate the boom in the direction in which welding will proceed until the welding head is at the other end of the path — i.e., where the boom is most extended. Position stop member 40 so that it closes limit switch 82 when the boom reaches this position.
9. Return the boom to the starting position.
10. Set initial boom rotational speed; this is usually such that the welding nozzle will have a velocity of about 60 lineal inches per minute relative to the surface of the housing being rebuilt.
11. Set wire feed rate at approximately the speed necessary to provide the burn off rate and current desired and inch the wire forward until it extends from the nozzle tip so that the end of the welding wire or electrode is in position to begin welding. In this connection it should be noted that there is now no interest commercially in the low electrode burn-off-rates — i.e., less than 300 inches per minute — which were once commonly used for dredge pump resurfacing; with my apparatus the precision placing of beads allows the operator to use the following high burn off rates as common conditions with a typical 1½ electrical stickout:

for a 7/64-inch diameter tubular welding wire, 300–700 inches per minute burn off rate at 400–750 amps;

for a 3/32-inch diameter tubular welding wire, 350–800 inches per minute burn off rate at 400–700 amps.

Also, I have found that whereas some prior teaching, e.g. U.S. Pat. No. 3,254,192, was to the effect that the deposited weld bead cross-section must be approximately twice as wide as it is thick, with my apparatus and method optimum weld deposits are obtained with beads whose longer cross-sectional dimension is from three to four times their shorter dimension, i.e., on the horizontal portion of the housing their width is three to four times their thickness, and on the essentially vertical side walls their thickness is three to four times their width.

12. Study the curvature of the surface to be rebuilt and determine what combination of movements of the welding nozzle 25 is required for proper stepover at the completion of each bead. This determination is best done through experience; generally the nozzle should index a distance of approximately one-fourth inch. On the essentially horizontal surface of the bottom of the dredge pump housing 1 horizontal step motion is generally all that is required. When rebuilding the curved side portions of the interior surface of the housing the operator may decide that either angular movement alone or a combination of angular and horizontal or angular and vertical movements is necessary for proper positioning of the nozzle for welding, including maintaining the end of the welding nozzle 25 at approximately a constant distance from the surface.
13. Having determined the distance and type of motion required of the nozzle in indexing, program the nozzle movement by setting toggle switch 88 on the main control panel to HORIZ., OFF or VERT as necessary and toggle switches 87 and 90 to INDEX or OFF and adjusting the appropriate INDEX DIST. rheostats to provide the necessary total movement. As above indicated, the preferred apparatus uses a constant running time for indexing, the distance being adjusted by adjusting the speed of the indexing motors. Although constant speed motors and adjustable timing mechanisms could serve the same purpose, such combinations are considerably more expensive than constant timing means and adjustable speed motors.
14. Turn the BOOM toggle switch 85 on the main control panel to AUTO.
15. Set the BOOM DIR. toggle switch 86 on the remote control panel to LEFT or RIGHT depending on the direction in which the boom 13 is to rotate in depositing the first bead, counterclockwise being left and clockwise being right.
16. Set the VERT HORIZ. STEP toggle switch 89 on the remote control panel to IN or OUT depending on which way the nozzle is to index in the horizontal or vertical direction; if vertical indexing is used, IN is down and OUT is up. If no horizontal or vertical index motion is used the position of the toggle switch on the remote control panel is unimportant as the HORIZ. STEP VERT toggle switch 87 on the main control panel will be set at OFF.
17. Set the ANGLE toggle switch 91 on the remote control panel to UP or DOWN depending upon the index motion desired. Again if no angular index motion is used the NOZZLE ANGLE toggle switch 90 on the main control panel will be set at OFF so the remote toggle switch position will be unimportant.
18. Set the WELD toggle switch 92 on the remote control panel to ON to initiate the arc and start rotation of the boom.

On completion of step 18 the boom rotates and moves the welding nozzle around the interior surface of the housing to deposit the first bead of weld metal. As the boom rotates the cam follower 34 causes radial extension of the boom in conformance with the shape of the cam face 32. Such radial extension causes the rack 36 mounted on the boom to turn the pinion 49 attached to the rotor of the multiturn potentiometer 130 in a clockwise direction, which increases the resistance in the potentiometer. The potentiometer is part of a silicon controlled rectifier (SCR) drive which causes a decrease in rotational speed of the drive motor 71 with increase in resistance of the potentiometer whereby to maintain the velocity of the welding means relative to the interior surface of the housing approximately constant. The size of the potentiometer needed — i.e., its total resistance — and the amount of change in resistance per revolution of the rotor can be selected by trial and error or from a knowledge of the characteristics of the SCR drive and the motor 71. The basis for such determination is that the rotational speed of the boom at one point in the path defined by the cam be related to its rotational speed at a second point approximately according to the formula $$S1/S2 = R2/R1$$

where $S1$ is the rotational speed of the boom in rpm at point 1, $S2$ is the boom rotational speed at point 2 in rpm and $R1$ and $R2$ are the distances from the center of boom rotation to the end of the welding nozzle at points 1 and 2 respectively. Although in the form of apparatus illustrated I have chosen to use an SCR circuit including a multiturn potentiometer, other means as will suggest themselves to those skilled in the art may be used to automatically vary the rotational speed of the boom inversely with boom extension, the only requirement being that the relationship above set forth be approximately maintained.

When the limit switch 82 mounted on the housing 14 coacts with the stop member 40 on the boom 13 the boom motor 71 reverses direction and the indexing motors adjust the nozzle position for the second bead. The running time of the indexing motors, which is predetermined, is very short so that indexing is normally completed in a fraction of a second.

In a preferred form of my apparatus in which weld puddle runout is decreased the cycle at the limit switch is modified in either of two ways. In one, coaction of the limit switch with the stop member causes discontinuance of weld deposition, e.g., by stopping wire feed, and a cessation of boom rotation, both for a predetermined period of time, e.g., several seconds, along with repositioning of the nozzle; during the predetermined period of time the molten weld metal puddle at the end of the just deposited bead cools and at least partially solidifies so that on resumption of weld deposition and boom rotation the total amount of molten weld metal at that point is decreased and thus the likelihood of runout is decreased.

In a second and preferred modification of the cycle which occurs when the limit switch coacts with the stop member, weld puddle runout is decreased by causing the wire feed to stop and the indexing motors to adjust the nozzle position when the limit switch is closed and at the same time causing a time-delay switch to close which allows boom rotation to continue for a predetermined period of time, e.g., several seconds, before reversal of the direction of the boom motor 71 occurs. In this modification the limit switch remains closed by the stop member, which is of elongate shape for this purpose, until the boom has reversed direction and returned to the point at which the limit switch was first closed, where the stop member breaks contact with the limit switch and allows it to open. On opening of the limit switch wire feed and weld deposition resume.

After the cycle at the limit switch is completed the second bead is deposited in the reverse direction from the first and in most instances contiguously thereto. At the end of the second bead limit switch 83 on the housing coacts with stop member 39 at the beginning of the path, causing a repeat of the indexing motions and another reversal in direction of the carriage drive motor in preparation for deposition of the third bead. This process continues until the curvature of the interior surface of the dredge pump housing dictates a change in the combination of index motions, at which time the operator stops welding and readjusts the indexing controls.

While various welding systems, e.g., gas shielded or self shielded, may be employed, I prefer to use a welding nozzle and feed continuous consumable welding electrode or wire through the nozzle and maintain a weld depositing arc between the end of the consumable welding electrode and the interior surface of the housing. Desirably the electrode or wire is self-shielded tubular continuous consumable welding electrode having broad tolerance for changes in stickout resulting from irregularities in the housing surface which is characterized by wear which may be uneven.

As was true with the apparatus disclosed in my above mentioned Pat. No. 3,627,973, an attractive and important feature of the present apparatus is that when the preferred self-shielded electrode is used with it the arc is "self adjusting", i.e., is tolerant to small changes in nozzle-to-surface distance caused either by irregularities in the surface being rebuilt or, more importantly, by the fact that the programmed nozzle indexing may not always follow the precise curvature of the interior surface of the housing. This self-adjusting feature extends the time that the unit can run without operator attention on one group of nozzle index settings and thus increases the useful arc time per job.

Figure 12:
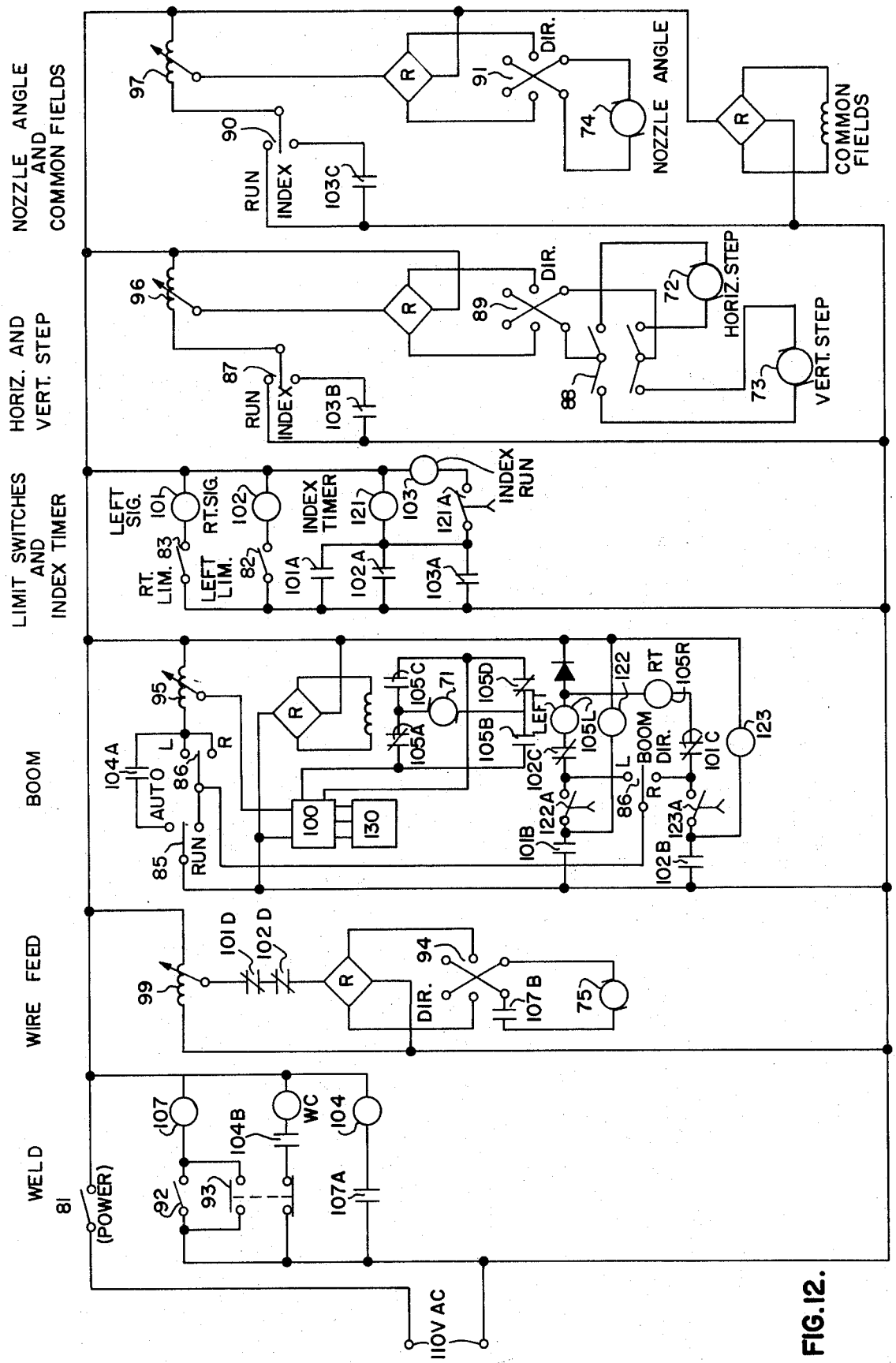
FIG. 12 is a wiring diagram illustrating one electrical wiring system which may be used for the apparatus of FIGS. 3–11.

FIG. 12 is a somewhat simplified wiring diagram illustrating one of many forms of electrical wiring system which may be employed for the apparatus shown in FIGS. 3 through 11. The top and bottom lines of FIG. 12 are conductors of an electrical circuit having a potential of 110 volts A.C. as indicated at the left of the figure. The simplified diagram includes functional groups of components labeled at the top of the figure. All the motors are D.C. motors, current for which is rectified from the A.C. by rectifiers shown in the diagram as diamonds enclosing the letter R. Circles in the diagram represent relay coils which when energized close or open one or more sets of relay contacts. The relay contacts are shown by a pair of short parallel vertical lines when normally open and by such lines crossed by a short diagonal line when normally closed; each set of contacts carries the number of the coil by which it is activated followed by A, B, C or D. Not shown is the electrical circuit for the welding arc itself which is typically a conventional rectified D C. circuit well known to those skilled in the art. The switch labeled WC in the WELD section of the figure is the weld contact switch which closes the arc circuit to produce an arc when the electrode tip strikes the workpiece.

The illustrated form of control circuit functions essentially as follows. First, the main power is turned on by closing switch 81. If it is desired to rotate the boom 14 to its starting position without welding, switch 85 on the main control panel 27 is set to RUN and switch 86 on the remote panel 28 is set to LEFT or RIGHT as desired, thus completing the circuit through the boom motor 71 and causing the boom to rotate until the switch 85 is set to OFF. For the sake of example, assume that the boom is run to the right or clockwise end of the path over which weld metal is to be deposited, viewing the apparatus from inside the shell 1. When the carriage is in position switch 85 is reset to AUTO, which directs current through contacts 104A to the SPEED VAT 95, and BOOM DIR. switch 86 on the remote control panel is set to LEFT so that at the start of welding motor 71 will rotate the boom counterclockwise or to the left to deposit the first bead of weld metal.

To position the nozzle 25 for depositing the initial weld bead assume that the nozzle must be run toward the housing a certain distance in the horizontal direction and upwardly through a certain angle. These motions are normally accomplished sequentially as opposed to all at one time. For horizontal positioning, switch 88 on the main control panel 27 would be set to HORIZ which locks horizontal step motor 72 in the circuit and removes vertical step motor 73 from the circuit. Next the VERT HORIZ STEP switch 89 on the remote control panel 28 would be set to IN, which directs current so as to cause reversible horizontal step motor 72 to rotate properly to move the horizontal member 20 toward the housing and HORIZ STEP VERTICAL switch 87 on the main control panel 27 would be set to RUN, which bypasses contacts 103B and sends current directly through INDEX DIST. VAT 96 thus completing the A.C. circuit and thereby sending D.C. through motor 72 to cause the desired horizontal motion. At the completion of the desired horizontal motion, switch 87 would be reset to OFF or INDEX, as desired. As previously explained, INDEX DIST. VAT 96 determines the speed of motor 72 for both running and indexing. The circuit for the nozzle angle motor 74 is identical to that for the horizontal step motor 72 and adjusting initial nozzle position in the angular direction proceeds as described for the horizontal adjustment. For this example let it be assumed that the nozzle 25 must index horizontally and angularly at the completion of the first pass in order to be in proper position for the second contiguous bead.

After initially positioning the nozzle in such a case switches 87 and 90 would both be set to INDEX, which directs current through relay contacts 103B and 103C respectively, whenever the contacts are closed. The directions of motion in the horizontal and vertical directions are selected by appropriately positioning switches 89 and 91, respectively.

To inch the welding electrode forward to welding position, WIRE DIRECTION switch 94 is set to FOR'D and the WIRE FEED RATE VAT 99 is set at the desired wire feed speed. INCH button 93 is then depressed which energizes coil 107, causing contacts 107A and 107B to close. The closing of contacts 107A has no effect in inching since those contacts are taken out of the circuit when the button 93 is pushed; however, closing of contacts 107B completes the D.C. circuit to wire feed motor 75 and causes the motor to feed wire until the INCH button is released.

When preliminary positioning of the nozzle, boom and electrode is completed the operator is ready to begin depositing weld metal. The operation of the illustrated control circuit during the deposition of two contiguous beads of weld metal will now be described.

To start welding the operator turns WELD switch 92 on the remote control panel 28 to ON. This energizes coil 107 which closes contacts 107A and 107B. Closing of contacts 107A energizes coil 104 which closes contacts 104B to complete the circuit through the weld contact switch and thus energize the electrode for welding. Closing of contacts 107B completes the circuit through the wire feed motor 75 to start wire feeding into the arc. Energizing of coil 104 also closes contacts 104A to feed current to the boom drive motor 71, which starts the boom 13 rotating and radially extending or retracting as dictated by the cam profile to deposit weld metal on the interior surface of the housing. In this exemplary situation the boom 13 initially rotates to the left or counterclockwise because BOOM DIR switch 86 on the remote control panel 28 was initially set at LEFT, which sets contacts 105A, 105B, 105C and 105D to cause reversible motor 71 to move the end of the boom 13 carrying the welding means to the left.

As the boom rotates counterclockwise, moving the welding means to the left around the housing shown in FIG. 1, the boom extends radially, causing the rotor of the multiturn potentiometer 130 to increase the resistance of the potentiometer, which in turn causes the SCR Drive 100 to decrease the speed of boom drive motor 71 whereby to automatically maintain the velocity of the welding means relative to the interior surface of the housing approximately constant.

Deposition of weld metal continues until radial extension of the boom causes stop member 40 on the boom to close the left limit switch 82, which energizes the RT. SIG coil 102 which in turn closes contacts 102A and 102B and opens contacts 102C and 102D. Contacts 102A and 102B automatically reopen and contacts 102C and 102D automatically reclose when left limit switch 82 is opened by radial retraction of the boom which moves stop member 40 away from the limit switch. Opening of contacts 102D cuts off current flow to wire feed motor 75 and thereby stops wire feed for the short period during which the left limit switch 82 is closed. Closing of contacts 102A starts operation of the INDEX TIMER 121 and energizes the INDEX RUN coil 103; energizing the INDEX RUN coil 103 closes contacts 103A, 103B, and 103C. Contacts 103A act as a lock on the circuit through switch 121A. Closing of contacts 103B and 103C causes the indexing motors 72 (in this case) and 74, respectively, to run. When the INDEX TIMER 121 reaches the end of its preset time interval it temporarily opens switch 121A and this deenergizes coil 103 which allows contacts 103A, 103B and 103C to open and thereby stops the indexing motors. As previously indicated, indexing is normally completed in only a fraction of a second. Closing of contacts 102B energizes coil 123 which starts the predetermined time interval of time delay switch 123A to begin running. At the end of the predetermined interval, e.g., 3 seconds, switch 123A closes, which energizes coil 105R, causing contacts 105B and 105C to close and contacts 105A and 105D to open, thus reversing the direction of current flow through the boom drive motor 71 and thereby reversing the direction of rotation of the boom 13. Thus the boom continues to rotate in its original direction for a short time before reversing; indexing is generally completed during this time, and in any event is completed before the boom rotates in the opposite direction sufficiently to allow limit switch 82 to reopen by virtue of radial retraction of the boom dictated by the cam profile. During the period that limit switch 82 is closed wire feed and weld deposition are stopped as above indicated; this brief period allows the molten weld puddle at the end of the first bead to cool and thus decreases weld puddle runout.

The nozzle has now been indexed for the second bead and the boom rotation direction has been reversed; as the boom rotates in the reverse direction, in this case clockwise, the cam profile causes radial retraction of the boom and movement of the welding means to the right over the interior surface of the housing. When the end of the first bead is passed radial retraction of the boom allows limit switch 82 to reopen, which deenergizes coil 102, reclosing contacts 102D and allowing wire feed to begin again so that the electrode again advances into the arc through the nozzle 25 to deposit the second bead toward the right. Deenergizing of coil 102 also reopens contacts 102A and 102B and recloses contacts 102C.

When the right end of the path is reached the boom's radial retraction causes stop member 39 to close the right limit switch 83 which energizes LEFT SIG. coil 101. Energizing of coil 101 closes contacts 101A and 101B and opens contacts 101C and 101D. Opening of contacts 101D stops wire feed and weld deposition in the manner indicated above for opening of contacts 102D. Closing of contacts 101A starts the INDEX TIMER again and energizes INDEX RUN coil 103 which closes contacts 103A, 103B and 103C to cause another indexing of the nozzle to position for depositing the third bead. Closing of contacts 101B energizes coil 122 which activates time delay switch 122A so that after the predetermined time interval it closes, energizing coil 105L which closes contacts 105A and 105D and opens contacts 105B and 105C thereby sending current through boom drive motor 71 in the original direction and causing the boom 13 to again rotate counterclockwise and move the welding means to the left. When the INDEX TIMER 121 has completed the preset interval of time it temporarily opens switch 121A which deenergizes the INDEX RUN coil 103 and thereby stops indexing motors 72 and 74. Again, as the boom 13 rotates the cam profile causes radial extension thereof which causes stop member 39 to move away from the right limit switch 83, which opens to deenergize coil 101 and thereby reopen contacts 101A and 101B and reclose contacts 101C and 101D, the latter causing resumption of wire feeding and weld metal deposition at the predetermined point at the right end of the path.

While I have shown and described a present preferred embodiment of the invention and have illustrated certain present preferred methods of practicing the same, it is to be distinctly understood that the invention is not limited thereto but may be otherwise variously embodied and practiced within the scope of the following claims.

I claim:

1. In apparatus for the successive automatic arc welding deposition of generally horizontal weld beads upon the interior surface of a housing for a dredge pump or the like while the housing is lying on its side, the apparatus being of the type which includes
   a. a rotatable, radially extensible horizontal boom mounted on a vertical shaft, the boom extending substantially perpendicular to the shaft,
   b. weld metal depositing means mounted on an outboard end of the boom,
   c. means for rotating the boom about the shaft axis whereby to move the weld metal depositing means in a horizontal path over the interior surface of the housing, and
   d. means for controlling the boom extension during rotation to automatically regulate conformance of the weld metal depositing means to the interior surface of the housing,
   the improvement which comprises
   e. means for automatically controlling the rotational speed of the boom so that as the boom extends the speed of movement of the weld metal depositing means relative to the interior surface of the housing remains approximately constant during weld bead deposition.

2. Apparatus as claimed in claim 1 wherein means $d$ comprise cam and follower means.

3. In apparatus for the successive automatic arc welding deposition of generally horizontal weld beads between predetermined points upon the interior surface of a housing for a dredge pump or the like while the housing is lying on its side, the apparatus being of the type which includes
   a. a rotatable, radially extensible horizontal boom mounted on a vertical shaft, the boom extending substantially perpendicular to the shaft,
   b. weld metal depositing means mounted on an outboard end of the boom,
   c. means for rotating the boom about the shaft axis whereby to move the weld metal depositing means in a horizontal path over the interior surface of the housing,
   d. means for controlling the boom extension during rotation to automatically regulate conformance of the weld metal depositing means to the interior surface of the housing,
   e. means for automatically reversing the direction of welding after the weld metal depositing means have completed a weld pass at either of the predetermined points, and
   f. means for automatically repositioning the weld metal depositing means at each weld direction reversal point,
   the improvement which comprises
   g. means for automatically controlling the rotational speed of the boom so that as the boom extends the speed of movement of the weld metal depositing means relative to the interior surface of the housing remains approximately constant during weld bead deposition.

4. Apparatus as claimed in claim 3 further including timing means for automatically discontinuing weld deposition and delaying movement of the boom, both for a predetermined period of time, at either of the predetermined points whereby weld puddle runout is decreased.

5. Apparatus as claimed in claim 4 wherein means *d* comprise cam and follower means.

6. Apparatus as claimed in claim 3, further including
   h. means for automatically discontinuing weld deposition at either of the predetermined points while continuing movement of the weld metal depositing means in a first horizontal direction,
   i. timing means for delaying reversal of the weld metal depositing means for a predetermined time after the weld metal depositing means have travelled past the point of discontinuance of weld deposition, and
   j. means for automatically resuming weld deposition when the weld metal depositing means pass the point of discontinuance of weld deposition moving in the opposite direction from the first horizontal direction, means *h, i* and *j* in combination constituting means to reduce weld puddle runout at either of the predetermined points.

7. Apparatus as claimed in claim 6 wherein means *d* comprise cam and follower means.

8. Apparatus as claimed in claim 3 wherein means *c* comprise a reversible variable speed electric motor and means *g* comprise means connected to the speed control of the motor and responsive to the boom position for automatically causing the motor speed to decrease with boom extension and to increase with boom retraction.

9. A method of applying generally horizontal weld beads upon the interior surface of a housing for a dredge pump or the like, which housing has a circular side opening, comprising
   a. positioning the housing on its side so that the side opening is at the top or bottom thereof,
   b. positioning a rotatable radially extensible horizontal boom within the housing with its center of rotation approximately at the center of the circular side opening of the housing,
   c. mounting weld metal depositing means on an outboard end of the boom,
   d. rotating the boom to move the weld metal depositing means in a horizontal path over the interior surface of the housing,
   e. controlling the relationship between boom rotational position and boom extension so that during rotation the end of the boom carrying the weld metal depositing means is maintained approximately a constant distance from the interior surface of the housing,
   f. feeding consumable welding wire through the weld metal depositing means,
   g. establishing an arc between the end of the welding wire and the interior surface of the housing to deposit weld metal in a horizontal path, and
   h. controlling rotational speed of the boom so that as the boom extends its rotational speed automatically decreases at a rate sufficient to maintain approximately constant the speed of movement of the weld metal depositing means relative to the interior surface of the housing.

10. A method as claimed in claim 9 wherein step *e* comprises forming a cam plate whose changes in distance between cam face and boom rotation point closely approximate the corresponding changes in distance between the dredge housing interior and the boom rotation point, attaching a cam follower to the horizontal boom and positioning the cam so that the cam follower conforms to the cam face and causes radial extension or retraction of the boom during boom rotation, such radial extension or retraction serving to maintain approximately constant the distance between the weld metal depositing means and the interior surface of the housing.

* * * * *

UNITED STATES PATENT OFFICE
CERTIFICATE OF CORRECTION

Patent No. 3,795,785         Dated March 5, 1974

Inventor(s) EDWARD E. SMITH

It is certified that error appears in the above-identified patent and that said Letters Patent are hereby corrected as shown below:

Column 3, line 42, change "aS" to --as--. Column 4, line 41, change "deposition" to --depositing--. Column 7, line 60, change "carrier" to --carried--.

Signed and sealed this 6th day of August 1974.

(SEAL)
Attest:

McCOY M. GIBSON, JR.
Attesting Officer

C. MARSHALL DANN
Commissioner of Patents